United States Patent
Xiao et al.

(10) Patent No.: US 10,337,312 B2
(45) Date of Patent: Jul. 2, 2019

(54) ELECTRICAL SUBMERSIBLE PUMPING SYSTEM WITH SEPARATOR

(71) Applicant: Saudi Arabian Oil Company, Dhahran (SA)

(72) Inventors: Jinjiang Xiao, Dhahran (SA); Chidirim Enoch Ejim, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 193 days.

(21) Appl. No.: 15/403,642

(22) Filed: Jan. 11, 2017

(65) Prior Publication Data
US 2018/0195375 A1 Jul. 12, 2018

(51) Int. Cl.
| | | |
|---|---|---|
| *E21B 43/38* | (2006.01) | |
| *F04D 29/22* | (2006.01) | |
| *F04D 1/06* | (2006.01) | |
| *F04D 29/44* | (2006.01) | |
| *E21B 43/12* | (2006.01) | |
| *B01D 17/02* | (2006.01) | |

(52) U.S. Cl.
CPC .......... *E21B 43/38* (2013.01); *B01D 17/0217* (2013.01); *E21B 43/121* (2013.01); *E21B 43/128* (2013.01); *E21B 43/385* (2013.01); *F04D 1/06* (2013.01); *F04D 29/22* (2013.01); *F04D 29/445* (2013.01)

(58) Field of Classification Search
CPC ...... E21B 43/128; E21B 43/121; E21B 43/38; E21B 43/34
See application file for complete search history.

(56) References Cited

U.S. PATENT DOCUMENTS

| 3,291,057 A | 12/1966 | Carle |
| 3,300,950 A | 1/1967 | Carle |
| 6,089,317 A | 7/2000 | Shaw |
| 6,105,671 A | 8/2000 | McKinzie et al. |

(Continued)

FOREIGN PATENT DOCUMENTS

| GB | 2340863 A | 3/2000 |
| WO | 2015041655 A1 | 3/2015 |

OTHER PUBLICATIONS

Partial International Search Report and Written Opinion for related PCT application PCT/US2018/013256 dated Mar. 23, 2018.

(Continued)

*Primary Examiner* — David Carroll
(74) *Attorney, Agent, or Firm* — Braceswell LLP; Constance G. Rhebergen; Keith R. Derrington

(57) ABSTRACT

A system and method of producing fluid from a wellbore, and that separates water from the fluid. The system includes an electrical submersible pumping system with a pump having impellers and diffusers, and a separation system at a discharge end of the pump. The separation system includes a helical flow path and separation chamber downstream of the path. Directing the fluid through the helical flow path centrifugally separates the water from the fluid. Thus when the fluid flows into the separation chamber from the helical flow path, the water migrates to the outer radius of the separation chamber. The separated water flows through ports on the outer sidewall of the separation chamber, and the lower density portion of the fluid flows through a port proximate a middle portion of the separation chamber.

17 Claims, 3 Drawing Sheets

(56) References Cited

U.S. PATENT DOCUMENTS

| | | | |
|---|---|---|---|
| 6,283,204 B1 | 9/2001 | Brady et al. | |
| 6,367,547 B1 | 4/2002 | Towers et al. | |
| 6,547,003 B1 * | 4/2003 | Bangash | E21B 43/40 |
| | | | 166/106 |
| 6,668,925 B2 | 12/2003 | Shaw et al. | |
| 6,672,387 B2 | 1/2004 | Brady et al. | |
| 7,445,429 B2 | 11/2008 | Wilson et al. | |
| 7,814,976 B2 | 10/2010 | Hackworth et al. | |
| 7,828,058 B2 | 11/2010 | Fielder | |
| 8,196,657 B2 | 6/2012 | Kennedy | |
| 8,757,256 B2 | 6/2014 | Li et al. | |
| 2002/0189807 A1 | 12/2002 | Emanuele et al. | |
| 2004/0144534 A1 | 7/2004 | Lee | |
| 2005/0281683 A1 | 12/2005 | Brown et al. | |
| 2009/0056939 A1 * | 3/2009 | Hackworth | E21B 43/385 |
| | | | 166/265 |
| 2009/0194295 A1 | 8/2009 | Thompson et al. | |
| 2012/0006543 A1 | 1/2012 | Cox et al. | |
| 2013/0284423 A1 | 10/2013 | Morrison | |
| 2015/0159474 A1 | 6/2015 | Pedersen | |
| 2016/0201444 A1 * | 7/2016 | Hardee | E21B 43/128 |
| | | | 166/265 |

OTHER PUBLICATIONS

International Search Report and Written Opinion for related PCT application PCT/US2018/013256 dated May 15, 2018.

\* cited by examiner

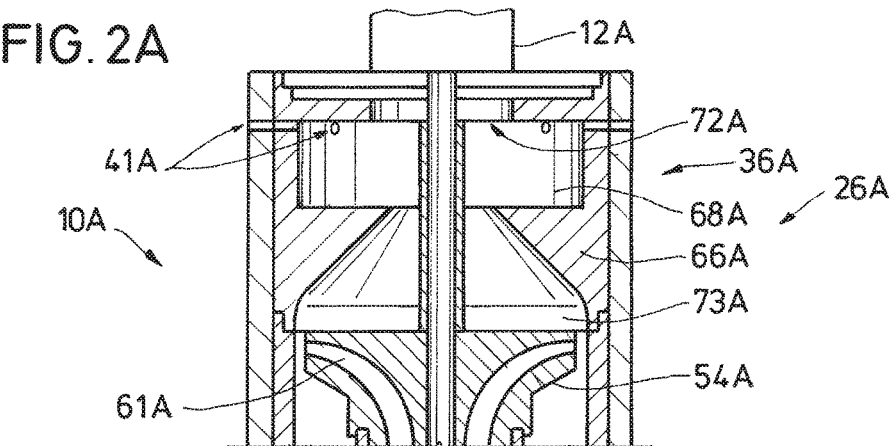
FIG. 2A
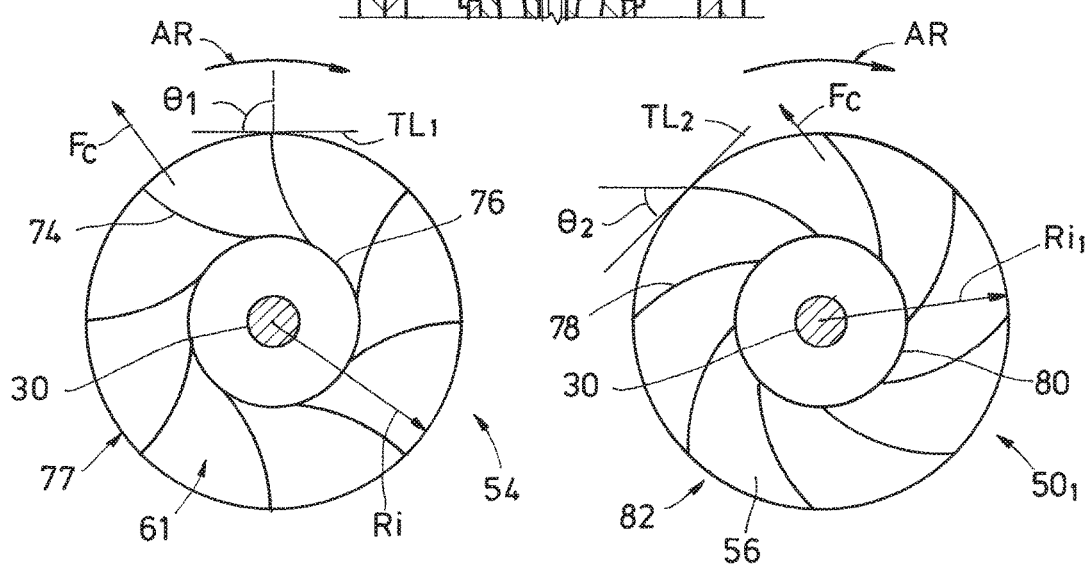
FIG. 3A
FIG. 3B
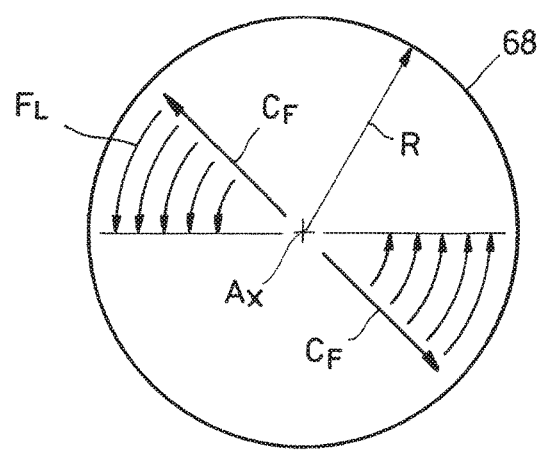
FIG. 4

ELECTRICAL SUBMERSIBLE PUMPING SYSTEM WITH SEPARATOR

BACKGROUND OF THE INVENTION

1. Field of Invention

The present disclosure relates to a system and method of producing fluid from a wellbore using an electrical submersible pumping system, and separating water from the produced fluid with a centrifugal separation.

2. Description of Prior Art

Electrical submersible pumping ("ESP") systems are deployed in some hydrocarbon producing wellbores to provide artificial lift to deliver fluids to the surface. ESP systems are also sometimes used to transfer fluids from a wellsite to other equipment or facility for further processing. The fluids are usually made up of hydrocarbon and water. When installed, a typical ESP system is suspended in the wellbore at the bottom of a string of production tubing. Sometimes, ESP systems are inserted directly into the production tubing. In addition to a pump, ESP systems usually include an electrically powered motor for driving the pump, and a seal section for equalizing pressure in the motor to ambient. Centrifugal pumps usually have a stack of alternating impellers and diffusers coaxially arranged in a housing along a length of the pump. The impellers each attach to a shaft that couples to the motor; rotating the shaft and impellers forces fluid through passages that helically wind through the stack of impellers and diffusers. The produced fluid is pressurized as it is forced through the helical path in the pump. The pressurized fluid is discharged from the pump and into the production tubing, where the fluid is then conveyed to surface for distribution downstream for processing.

Often, water is included with the produced fluid, and which is separated from the produced fluid either downhole or on surface. Usually the separated water is injected back into the formation, where it can be used to pressure balance the reservoir or formation. Separation units for downhole use sometimes employ rotating blades disposed in a chamber to separate the water from the produced fluid. Further, known systems for use downhole increase the length of the ESP system which increases the difficulty of deploying the ESP system into lateral wellbores or wellbores having deviated portions. Further, the weight and capital costs of ESP systems are increased by adding these separation systems.

SUMMARY OF THE INVENTION

Disclosed herein is an example of a system for producing fluid from a well that includes a housing selectively disposed in the well, a separation chamber disposed in the housing, an impeller disposed in the housing and that is selectively rotatable about an axis, and a fluid passage extending radially through the impeller; the impeller having a discharge end in fluid communication with the separation chamber, and that extends along a path that is generally normal to a line that is tangential to an outer radius of the impeller, so that when fluid that has exited the fluid passage enters the separation chamber, the fluid is separated so that components of the fluid proximate an outer radius of the separation chamber have a density that is higher than a density of fluids that are distal from the outer radius of the separation chamber. The system can further include a bulkhead between the impeller and the separation chamber, and a helical flow path can be formed through the bulkhead through which the discharge end of the fluid passage is in fluid communication with the separation chamber. A radius of the helical flow path can optionally be reduced with distance away from the discharge end of the fluid passage. In an example, the impeller is an upper impeller, wherein the system further includes impellers and diffusers that define a stack, and wherein the fluid in the fluid passage is pressurized in the stack. In one embodiment, fluid is discharged from the impellers in the stack at an angle that is oblique to the fluid exiting the fluid discharge of the upper impeller. Ports can be included that are proximate an outer radius of the separation chamber, and through which higher density components of the fluid are discharged. The higher density components can optionally include water. The system can optionally include ports proximate an inner radius of the separation chamber, and through which lower density components of the fluid are discharged. The lower density components can include liquid hydrocarbons.

Described herein is another example system for producing fluid from a well and which includes a stack of impellers and diffusers having a fluid inlet and a fluid discharge, a separation chamber that selectively receives fluid discharged from the stack, and a means for increasing a swirl velocity of the fluid in the separation chamber so that higher density components of the fluid are centrifugally separated towards an outer radius of the separation chamber and lower density components of the fluid are distal from the outer radius of the separation chamber. The means can include a helical passage having an inlet in communication with the fluid discharge, and an exit in fluid communication with the separation chamber. The helical passage can have a radius that reduces with axial distance from the fluid discharge. The means can include an upper impeller that is disposed on an end of the stack proximate the separation chamber, and wherein flow paths for the fluid are provided on the upper impeller that extend along a generally straight path from an inlet of the impeller to an outer radius of the impeller.

Also described herein is an example of a method of producing fluid from a well and which includes receiving a connate fluid that has higher density components and lower density components, and that is produced from a subterranean formation, pressurizing the connate fluid to define a pressurized fluid, and separating the higher density components from the lower density components by directing the pressurized fluid through a helical passage so that the fluid follows a free vortex flow path. The method further includes discharging the pressurized fluid radially outward from an impeller and along a path that is substantially straight. The higher density components can include water, and which can be injected into the subterranean formation. The lower density components can include liquid hydrocarbon, which can be directed to an opening of the well.

BRIEF DESCRIPTION OF DRAWINGS

Some of the features and benefits of the present invention having been stated, others will become apparent as the description proceeds when taken in conjunction with the accompanying drawings, in which:

FIG. 2A is a side sectional view of a portion of an alternate example of the ESP system of FIG. 1.

FIGS. 3A and 3B are axial schematic views of impellers for use with the pump of FIG. 2.

FIG. 4 is a schematic example of fluid circulating in a separation chamber, and which is a part of the ESP system of FIG. 1.

Figure 1:
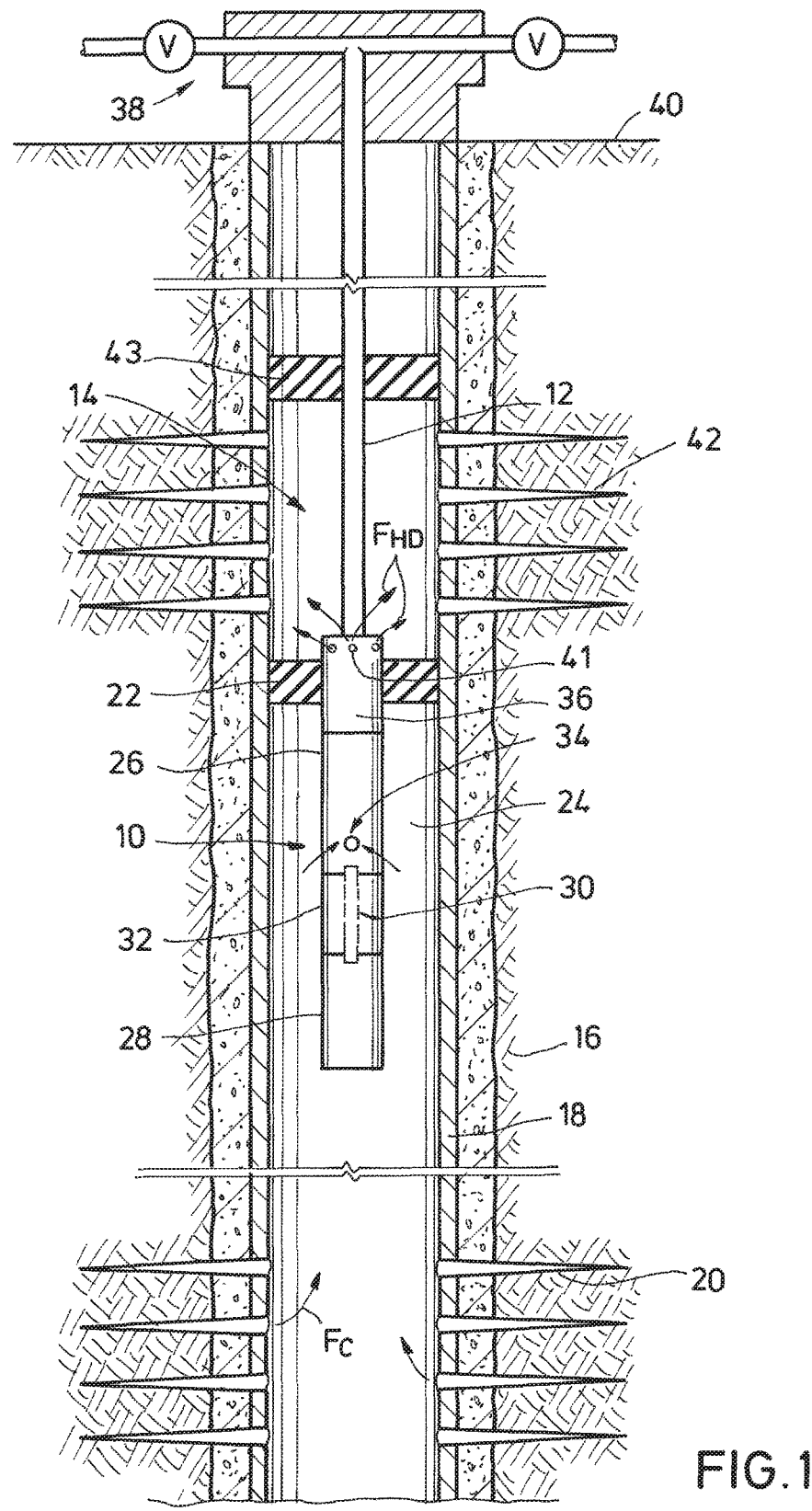
FIG. 1 is a side partial sectional view of an example of an ESP system deployed in a wellbore.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a side partial sectional view in FIG. 1 is one example of an electrical submersible pumping ("ESP") system 10 deployed on production tubing 12 and within a wellbore 14. Wellbore 14 is shown intersecting a subterranean formation 16, and where the wellbore 14 is lined with casing 18. Perforations 20 project radially outward from wellbore 14, through casing 18, and into formation 16, so that fluid within formation 16 can be produced with ESP system 10. Fluid $F_C$ is shown flowing from perforations 20, into wellbore 14, and being directed towards ESP system 10. In an example, fluid $F_C$ is connate fluid, and that includes liquid hydrocarbon, water, hydrocarbon gas, other substances trapped within a subterranean formation, or combinations thereof. Further in this example, a packer 22 is disposed in the annulus 24 between ESP system 10 and casing 18, so that fluid $F_C$ in wellbore 14 is diverted to ESP system 10 where it is pressurized before being transmitted into production tubing 12.

ESP system 10 includes a pump 26 that is driven by a motor 28, where a shaft 30 connects an output of motor 28 to pump 26. A seal section 32 is shown disposed between pump 26 and motor 28, and which includes a dielectric fluid that communicates between seal section 32 and motor 28. Seal section 32 selectively pressurizes the dielectric fluid to pressures ambient to ESP system 10 so that seals within the ESP system 10 are not subjected to large differential pressures. In the illustrated example, pump 26, seal section 32, and motor 28 each have a generally cylindrical configuration. Fluid $F_C$ produced from perforations 20 is shown flowing towards an inlet 34 formed on pump 26 where the fluid $F_C$ is pressurized so it can be transmitted uphole. After being pressurized by pump 26 fluid $F_C$ is directed to a separator system 36 at a discharge end of pump 26 so that fluids of different densities within the fluid $F_C$ being produced from formation 16 can be separated from one another. Thus, in one example, some of the separated fluids are directed through production tubing 12 to a wellhead assembly 38 shown mounted on surface 40 at an opening of wellbore 14. In an example of operation, constituents of fluid $F_C$ are separated in the separator system 36 based on their respective densities so that a lower density fluid and a higher density are obtained from the fluid $F_C$. Further optionally, the lower density fluid is directed up the wellbore 14 within the production tubing 12, and the higher density fluid $F_{HD}$ is discharged from ports 41 provided on the separator system 36. Examples of perforations 42 are illustrated that extend into the formation 16 from sidewalls of the wellbore 14. In the alternative depicted, an upper packer 43 blocks passage of the higher density fluid $F_{HD}$ in the wellbore 14 and diverts the higher density fluid $F_{HD}$ into the perforations 42. Examples of the lower density fluid include hydrocarbon liquid and hydrocarbon gas. Examples of the higher density fluid include water.

Figure 2:
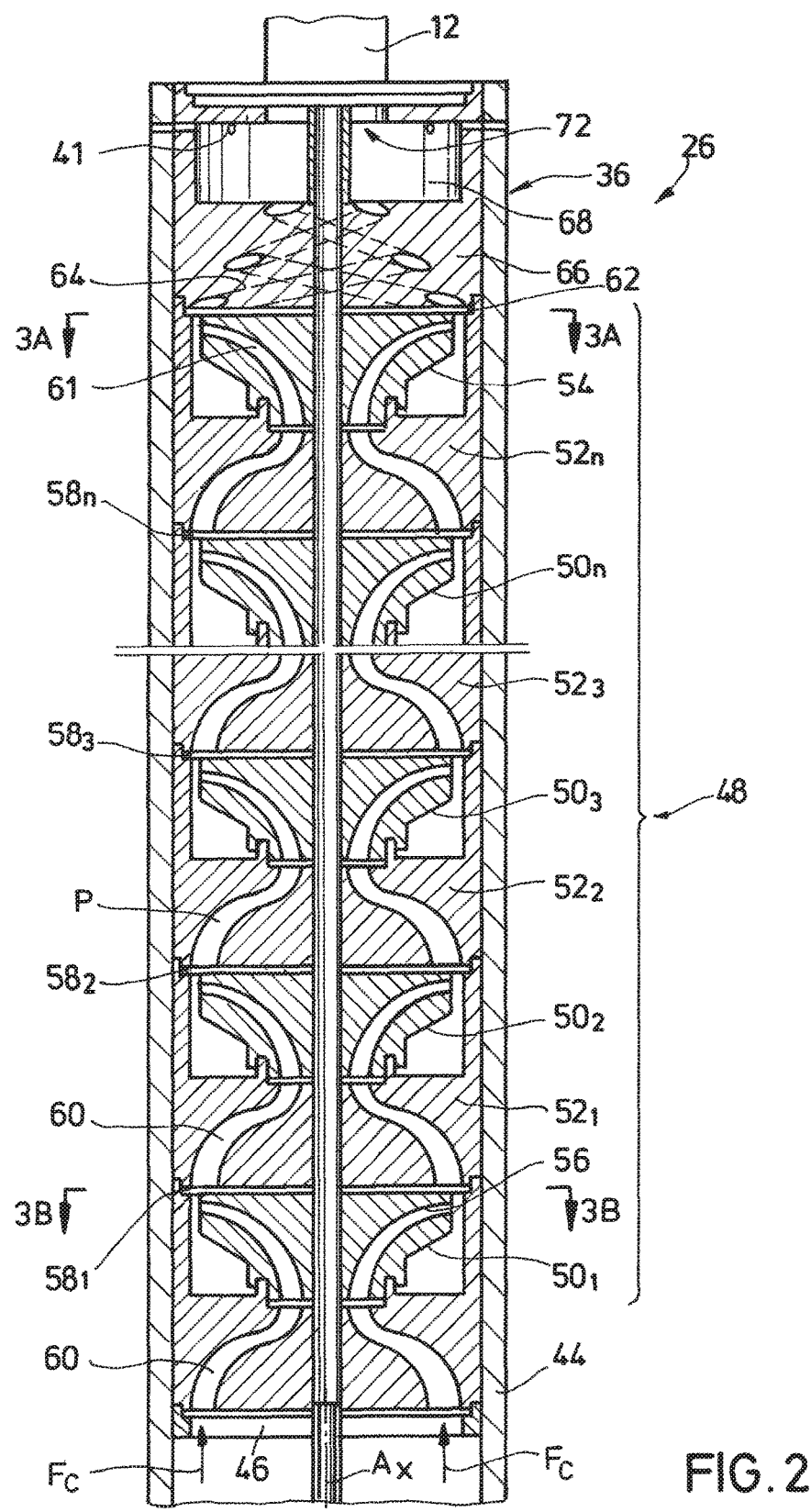
FIG. 2 is a side sectional view of a portion of a pump for use with the ESP system of FIG. 1.

Shown in a side sectional view FIG. 2 is a portion of the pump 26 with attached separator system 36. In this example the pump 26 and separator system 36 are provided with an outer housing 44 which is shown having a generally cylindrical outer surface and provides a covering for the components of pump 26 and separator system 36. Also provided within housing 44 is an example of an inlet chamber 46 shown disposed on an end of the pump 26 distal from separator system 36. Fluid $F_C$ enters inlet chamber 46 after flowing through inlet 34.

From inlet chamber 46 fluid $F_C$ flows into and is pressurized by a stack 48 of impellers $50_{1-n}$ and diffusers $52_{1-n}$, wherein the diffusers $52_{1-n}$ are respectively inserted between adjacent impellers $50_{1-n}$. Stack 48 further includes an upper impeller 54, that as will be described in more detail below, has a different configuration from impellers $50_{1-n}$. Further in the example of FIG. 2, the impellers $50_{1-n}$ are each equipped with passages 56 that proximate a lower end of each of the impellers $50_{1-n}$ extend in a direction substantially parallel with an axis $A_X$ of shaft 30. Within the impellers $50_{1-n}$, passages begin to change course and then curve radially outward towards an outer radial periphery of impellers $50_{1-n}$. The location of impellers $50_{1-n}$, 54 forces fluid $F_C$ radially outward and axially upward into intermediate chambers $58_{1-n}$ before the fluid enters a corresponding one of the diffusers $52_{1-n}$. In the diffusers $52_{1-n}$ the velocity of the fluid $F_C$ is slowed such that the kinetic energy in the fluid has been transferred into potential energy, thereby increasing pressure of the fluid $F_C$. The multiple stages of the sequential impellers $50_{1-n}$ and diffusers $52_{1-n}$ have an additive effect of increasing pressure so that when the fluid $F_C$ is discharged from the stack 48, the fluid is pressurized with enough potential head to travel either up production tubing 12 (FIG. 1) to surface 40, or be reinjected back into formation 16 via ports 41 and perforations 42. Similarly, passages 60 are provided in each of the diffusers $52_{1-n}$, and wherein the discharge of passages 60 registers with inlets of corresponding passages 56 within the next adjacent impeller $50_{1-n}$. The combination of the passages 56, 60 defines a flow path P that has a generally helical track through the stack 48.

Still referring to the example of FIG. 2, impeller 54, which has a shape and size similar to that of impellers $50_{1-n}$, also includes a passage 61 which has a contour substantially the same as passages 56 within impellers $50_{1-n}$. Pressurized fluid being discharged from impeller 54 via an exit end of passage 61 enters a gap 62. Flow loops 64 are shown on a side of gap 62 opposite impeller 54, and which are passages that are formed through a substantially solid bulkhead 66 that is coaxially disposed on an end of impeller 54 opposite from diffuser 52$_n$. In the illustrated embodiment, multiple flow loops 64 are shown and which each have an outer radius that decreases with distance from the impeller 54. An advantage of this helical and reducing radius configuration is that the principal of conservation of angular momentum for free vortex flows causes the swirl velocity of the fluid particles to be inversely proportional to the radius. With higher swirl velocity, the pressurized fluid experiences an increased centrifugal force that then creates separation of higher density components of the fluid $F_C$ from lower density components. To facilitate the separation, a separation chamber 68 is shown provided at a discharge end of the flow loops 64. In this example, ports 41 are shown provided proximate an outer radius of the separation chamber 68. Thus in this embodiment, the higher density fluid can be forced out through ports 41 and reinjected back into formation 16 (FIG. 1) through perforations 42. Further, a port 72 is shown proximate an axis of separation chamber 68, and through which the lower density fluid can be transmitted into production tubing 12, where it is then guided to surface 40.

Illustrated in a side sectional view in FIG. 2A, is a portion of an alternate example of the ESP system 10A. Here a cavity 73A is formed in the bulkhead 66A and with a radius that decreases with distance from where fluid is discharged from the impeller 54A. In an example, pressurized fluid exits passage 61A from within impeller 54A and is tangentially directed along the sidewall of cavity 73A. The decreasing radius of the cavity 73A with distance from the passage 61A in combination with the tangential direction of the flowing fluid increases a swirl velocity of the fluid. Further, a centrifugal force acting on the fluid in the cavity 73A due to its tangential path causes the higher density fluid to migrate radially outward. Thus as the fluid reaches the separation chamber 68A, the higher density fluid is positioned radially outward and directed into ports 41A, whereas the radially inward lower density fluid makes its way to ports 72A.

Shown in a plan view in FIG. 3A, and taken along lines 3A-3A of FIG. 2, is one example of impeller 54; which is shown having vanes 74 that project radially outward from an intake 76 towards an outer radius $R_i$ of impeller 54. The vanes 74 are planar members and having an elongate side that projects from the intake 76 to the outer radius $R_i$ of impeller 54 and having a height that projects between upper and lower surfaces of impeller 54. The upper and lower surfaces of impeller 54, and adjacent vanes 74, define the volume of the passages 61 (FIG. 2) within impeller 54. The shape and contour of the vanes 74 are such that fluid exiting impeller 54 at a discharge 77 of passage 61, extends along a generally straight path between intake 76 and outer radius $R_i$ of impeller 54. In one example, the direction of the fluid $F_C$ exiting impeller 54 can be defined as being generally perpendicular to a line $TL_1$ which is tangential to discharge 77 of passage 61. Thus, the angle theta$_1$ $\theta_1$ between $TL_1$ and vane 74 is about 90 degrees. Arrow $A_R$ represents a direction of angular rotation of the impeller 54. An advantage of the vanes 74 being configured in the manner of FIG. 3A is that the fluid $F_C$ being discharged into intermediate chamber 62 has a generally higher swirl velocity. In one example, swirl velocity describes an angular component of a velocity of a flow of the fluid $F_C$.

Referring now to FIG. 3B, shown in a plan view is an example of impeller 50$_1$ and which is taken along lines 3B-3B of FIG. 2. In this example, vanes 78 are shown which project radially outward from intake 80 into an outer portion of radius $R_{i1}$. The vanes 78 as shown are generally curved so that fluid $F_C$ exiting the discharge end 82 of passages 56 extend along a path at an angle theta$_2$ $\theta_2$, whose absolute value is less than 90 with respect to a line $TL_2$ that is tangential with an outer radius $R_{i1}$ of impeller 50$_1$. By discharging fluid $F_C$ from impeller 50$_1$, a lower or nominal swirl velocity of the fluid $F_C$ is achieved compared to that of impeller 54. Thus, a significant advantage exists by providing impeller 54 at the discharge end of stack 48 so that direction of the fluid exiting stack 48 has a velocity component in the angular direction (i.e. swirl velocity) that is greater than that which would be achieved using the impeller 50$_1$. In one embodiment, increasing swirl velocity necessarily increases centrifugal forces exerted onto the fluid $F_C$, thereby creating better separation of components in the fluid $F_C$ based on their densities.

FIG. 4 shows in plan view a schematic example of how the pressurized fluid $F_C$ flows within separation chamber 68 so that constituent fluids making up the total flow of fluid $F_C$ can be separated based on their respective densities. Here, flow lines $F_L$ are shown that represent relative velocities of the fluid $F_C$ within separation chamber 68 and after being discharged from stack 48 and flow loop 64. In this direction, the flow lines $F_L$ represent the high angular velocity component of the fluid within separation chamber 68 which due to the free vortex flow in combination with the constraint of the sidewalls of the separation chamber 68 exerts a centrifugal force $C_F$ onto the fluid $F_C$ in the separation chamber 68, where the centrifugal force $C_F$ is represented as projecting radially outward from axis $A_X$. As such, components within fluid $F_C$ having higher densities will necessarily migrate to portions of the separation chamber 68 having a higher radius. Thus, by siphoning portions of the fluid $F_C$ through ports disposed at the location proximate the outer radius R of separation chamber 68, heavier fluids can be separated from lighter fluids. Similarly, siphoning fluid proximate axis $A_X$ then yields components of the fluid $F_C$ having lower densities. Thus, the combination of the improved impeller 54 in combination with the flow loops 64 produces a flow of the fluid $F_C$ having a higher swirl velocity, which as explained above provides an enhanced method of separating fluid components based on their densities. Moreover, examples exist wherein fluid $F_C$ is made up primarily of liquid hydrocarbons, and wherein the process of separation in separation chamber 68 isolates different hydrocarbons from one another which are then routed to designated locations.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:
1. A system for producing fluid from a well comprising:
 a housing selectively disposed in the well;
 a separation chamber disposed in the housing;
 an impeller disposed in the housing and that is selectively rotatable about an axis;

a fluid passage extending radially through the impeller, having a discharge end in fluid communication with the separation chamber, and that extends along a path that is generally normal to a line that is tangential to an outer radius of the impeller; and a bulkhead between the impeller and the separation chamber having a helical flow path formed within and through which the discharge end of the fluid passage is in fluid communication with the separation chamber.

2. The system of claim 1, wherein the bulkhead comprises a configuration selected from the group consisting of a bulkhead having an helically shaped passage formed within and which defines the helical flow path, and a bulkhead with a frusto-conically shaped cavity and wherein the helical flow path is defined along sidewalls of the cavity.

3. The system of claim 1, wherein a radius of the helical flow path reduces with distance away from the discharge end of the fluid passage.

4. The system of claim 1, wherein the impeller comprises an upper impeller, wherein the system further comprises impellers and diffusers that define a stack, and wherein the fluid in the fluid passage is pressurized in the stack.

5. The system of claim 4, wherein fluid is discharged from the impellers in the stack at an angle that is oblique to the fluid exiting the fluid discharge of the upper impeller, and wherein fluid exiting the upper impeller flows into the bulkhead along an axial path set radially outward from the upper impeller.

6. The system of claim 1, further comprising ports proximate an outer radius of the separation chamber, and through which higher density components of the fluid are discharged.

7. The system of claim 6, wherein the higher density components comprise water.

8. The system of claim 1, further comprising ports proximate an inner radius of the separation chamber, and through which lower density components of the fluid are discharged.

9. The system of claim 8, wherein the lower density components comprise liquid hydrocarbons.

10. A system for producing fluid from a well comprising:
a stack of impellers and diffusers having a fluid inlet and a fluid discharge;
a separation chamber that selectively receives fluid discharged from the stack; and
a means for increasing a swirl velocity of a fluid exiting the fluid discharge, the means comprising a helical flow path having an inlet in communication with the fluid discharge, an exit in communication with the separation chamber, and a radius that decreases with distance from the fluid discharge.

11. The system of claim 10, wherein the means further comprises a bulkhead in which the helical flow path is formed.

12. The system of claim 11, wherein the helical flow path is in one of an enclosed passaged formed in the bulkhead, or along a sidewall of a frusto-conical cavity formed in the bulkhead.

13. The system of claim 10, wherein the means comprises an upper impeller that is disposed on an end of the stack proximate the separation chamber, and wherein flow paths for the fluid are provided on the upper impeller that extend along a generally straight path from an inlet of the impeller to an outer radius of the impeller.

14. A method of producing fluid from a well comprising:
receiving a production fluid produced from a subterranean formation and that comprises components having different densities;
pressurizing the production fluid with a rotating impeller to define a pressurized fluid; and
centrifugally separating the higher density components from the lower density components by directing the pressurized fluid through a helical passage having a radius that decreases with distance from the impeller to increase a swirl velocity of the pressurized fluid.

15. The method of claim 14, further comprising discharging the pressurized fluid radially outward from an impeller and along a path that is substantially straight.

16. The method of claim 14, wherein the higher density components comprise water, the method further comprising injecting the water into the subterranean formation.

17. The method of claim 14, wherein the lower density components comprise liquid hydrocarbon, the method further comprising directing the liquid hydrocarbon to an opening of the well.

* * * * *